Nov. 11, 1969  D. P. HASS  3,477,740
VEHICLE SAFETY APPARATUS
Filed Sept. 20, 1967  2 Sheets-Sheet 1

INVENTOR.
DAVID P. HASS
BY
ATTORNEYS

Nov. 11, 1969  D. P. HASS  3,477,740

VEHICLE SAFETY APPARATUS

Filed Sept. 20, 1967  2 Sheets-Sheet 2

INVENTOR.
DAVID P. HASS
BY
*Young, Raney, Flynn and Tarolli*
ATTORNEYS ated Nov. 11, 1969

3,477,740
VEHICLE SAFETY APPARATUS
David P. Hass, Detroit, Mich., assignor to Eaton Yale & Towne Inc., Cleveland, Ohio, a corporation of Ohio
Filed Sept. 20, 1967, Ser. No. 669,074
Int. Cl. B60r 11/00, 21/02, 21/04
U.S. Cl. 280—150         13 Claims

ABSTRACT OF THE DISCLOSURE

An occupant of a vehicle is protected from forceable impact with a structural part of the vehicle during a collision by a confinement which is inflated in response to the vehicle encountering a collision condition. The confinement is inflated in a manner such that it will act to initially move an occupant who is located so that the full force of inflation of the confinement would otherwise be applied against the occupant. The movement is such that the magnitude of the impact, if any, of the confinement on the occupant is minimized.

---

The present invention relates to a vehicle safety apparatus, and particularly to a vehicle safety apparatus which includes an inflatable confinement which is inflated to restrain and control the movement of the occupant of the vehicle during a collision.

A vehicle safety appartus which includes an inflatable confinement for controlling the movement of an occupant of a vehicle during a collision is known. In such apparatus, the confinement is inflated as a result of the vehicle encountering a collision condition and when inflated applies a force to the occupant of the vehicle to resist movement of the occupant of the vehicle as a result of the collision. Such confinements must be rapidly inflated.

It is well known that during a collision, there is a time interval between the initial impact of the vehicle with an obstruction and movement of the occupant of the vehicle as a result of the impact or collision. The confinement, therefore, should be inflated at least substantially during that interval of time. This, of course, requires a rapid inflation of the confinement. In the event an unrestrained occupant of the vehicle is located adjacent to the collapsed confinement, the confinement on inflation may forcefully strike the occupant. This may result in injury to the occupant since the fluid flow into the confinement is at a relatively high rate. For example, the confinement may be located in the dashboard of the vehicle, and at the time of impact an unrestrained child may be leaning on the dashboard. The full force of inflation of the confinement would be applied to the child which would result in serious injury to the child.

The principal object of the present invention is the provision of a new and improved vehicle safety apparatus for protecting an occupant of a vehicle from a forceful impact with a structural part of the vehicle during a collision and which safety apparatus operates in a manner to minimize the possibility of injury to an unrestrained occupant of the vehicle by operation thereof.

A further object of the present invention is the provision of a new and improved apparatus for protecting an occupant of a vehicle during a collision, who may be located adjacent a structrual part of the vehicle, and wherein the apparatus operates to initially move the occupant away from the structural part of the vehicle by the application of a relatively small force to the occupant and then restrains or controls movement of the occupant toward the structural part of the vehicle as a result of the collision by applying a substantially greater force to the occupant.

A still further object of the present invention is the provision of a new and improved means for inflating a confinement for controlling movement of an occupant of a vehicle during a collision and which includes means for directing a minor portion of the flow of fluid from a fluid supply into the confinement in a direction to effect movement of an initial portion of the confinement relative to the occupant, and wherein a major portion of the flow from the fluid supply is directed into the confinement in such a manner as to result in other portions of the confinement moving toward the occupant after the initial portion of the confinement moves relative to the occupant.

Another object of the present invention is the provision of a new and improved apparatus which includes a fluid supply which is opened to provide a flow of fluid therefrom and a diffuser member which diffuses or spreads the flow of fluid from the supply and directs the flow of fluid against the member which further diffuses and changes the direction of the flow of fluid prior to its being directed into an inflatable confinement.

Still another object of the present invention is the provision of a new and improved apparatus which includes a supply of fluid and a diffuser member which has a surface against which the supply of fluid is directed and which surface extends angularly with respect to the direction of the flow of fluid to be laterally directed and wherein a major portion of the fluid flow from the diffuser member is directed against a back plate member which again further diffuses and spreads the flow of fluid prior to its flow into a confinement for effecting inflation of the confinement.

Further objects and advantages of the present invention will be apparent to those skilled in the art to which it relates from the following detailed description of preferred thereof made with reference to the accompanying drawing forming a part of this specification and in which.

Figure 1:
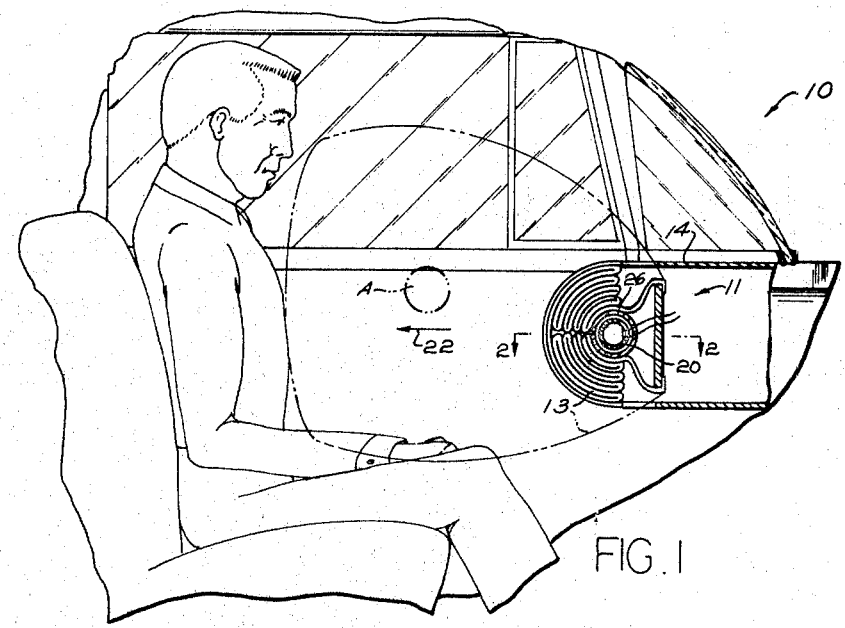
FIG. 1 is a schematic fragmentary view of a portion of an automotive vehicle embodying the present invention.

The present invention provides an improved safety apparatus for protecting an occupant of a vehicle. The safety apparatus is particularly constructed so as to minimize the possibility of injury to an occupant of a vehicle who may be located adjacent a structural part of the vehicle at the time of impact. In particular, the safety apparatus minimizes the possibility of injury to an "unrestrained" child who may be leaning on the dashboard of the vehicle or located adjacent some structural part of the vehicle at the time of the collision. The safety apparatus may be used in any type of vehicle, such as automobile, trucks or airplanes, etc., for protecting an occupant of the vehicle during the collision. As representing the prefered embodiment of the present invention, FIG. 1 illustrates the present invention as being applied to an automobile, generally designated 10.

The automobile 10 includes a safety apparatus, generally designated 11. The safety apparatus 11 includes a confinement 13 which has a collapsed or contracted condition, shown in FIG. 1, and an expanded condition, shown in dotted lines in FIG. 1. The confinement 13 is made of a suitable material which permits the confinement to be folded to its contracted position. The confinement is illustrated as being mounted in the dash 14 of the vehicle 10. The confinement may be mounted in other locations of the vehicle in order to protect the occupant of the vehicle. The confinement could be located in the door panels of the vehicle, the back of the front seat, or in any other location of the vehicle, as desired.

The safety apparatus 11 also includes a fluid supply in the form of a container 20. The container 20 contains fluid under pressure which, when released, flows into the container 20 to effect inflation of the confinement 13. The container 20 is opened in response to the vehicle encountering a collision condition to provide for flow of fluid from the container. The container 20 is opened preferably by means of an explosive 21 mounted, as shown schematically in FIG. 2, centrally of the container 20 and exteriorly of the container 20. The explosive 21 is ignited in any suitable manner, such as illustrated in application Ser. No. 562,289 (now Patent No. 3,414,292). Since the manner of sensing the collision condition and igniting the explosive may be as desired, no specific description thereof will be incorporated herein.

Figure 2:
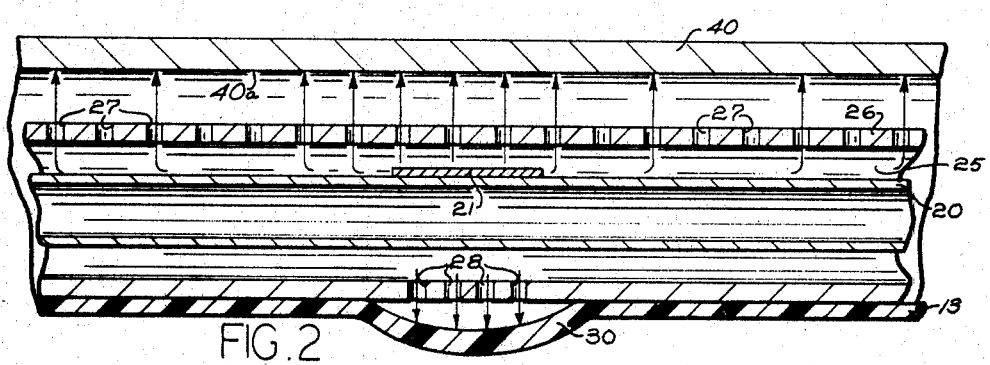
FIG. 2 is a sectional view taken approximately along the section line 2—2 of FIG. 1 and showing parts in an initial operating condition.

As shown in FIG. 2, the explosive is mounted on a portion of the container 20 which faces away from the occupant of the vehicle. As a result, the opening in the container which is formed when the explosive is ignited causes fluid to flow from the container 20 in a direction away from the occupant of the vehicle and away from the general direction of inflation of the confinement, which is generally in the direction indicated by the arrow 22 in FIG. 1.

Fluid which flows from the opening, flows into a chamber 25 defined by a diffuser member 26. The diffuser member 26 is a cylindrical member which encircles the fluid supply 20 and has wall portions which are spaced therefrom. The walls of the diffuser 25 are provided with a plurality of openings therein for directing the fluid from the chamber 25 outwardly of the diffuser. The openings may be slots or circular openings, as desired. The major number of openings in the diffuser member are located in the area of the diffuser member immediately adjacent the opening formed by the explosive. These openings are designated 27 in the drawing. Fluid which flows through the openings 27 flows in a direction away from the occupant of the vehicle and in a direction opposite the general direction 22 of inflation of the confinement.

The diffuser member 26 has means providing for flow of a minor amount of fluid toward the occupant of the vehicle and in the direction of inflation of the confinement. As illustrated in the drawing, this means comprises a small plurality of openings, designated 28. The openings 28 are provided in the portion of the diffuser member 26 which faces the occupant of the vehicle. The flow of fluid through the openings 28 is in a direction toward the occupant and in the general direction 22 of inflation of the confinement 13. Moreover, the flow through openings 28 is substantially less than the flow of fluid through the openings 27.

The flow of fluid through the openings 28 provides for movement of an initial portion 30 of the wall defining the confinement 13 in the direction of the arrow 22 and toward the occupant of the vehicle. This initial movement of the portion 30 is effected by the flow through the openings 28 which effects movement of the portion 30 in advance of movement of other portions of the wall defining the confinement toward the occupant of the vehicle. As a result, if an occupant of the vehicle is located adjacent to a structural part of the vehicle, in this case, the windshield or dash, the portion 30 of the confinement would engage the occupant and apply a force to the occupant to initiate movement of the occupant in the direction of the arrow 22 and away from the structural part of the vehicle. The force applied by the wall portion 30 of the confinement to the occupant would be relatively small as compared to the force of the entire confinement hitting the occupant.

Figure 3:
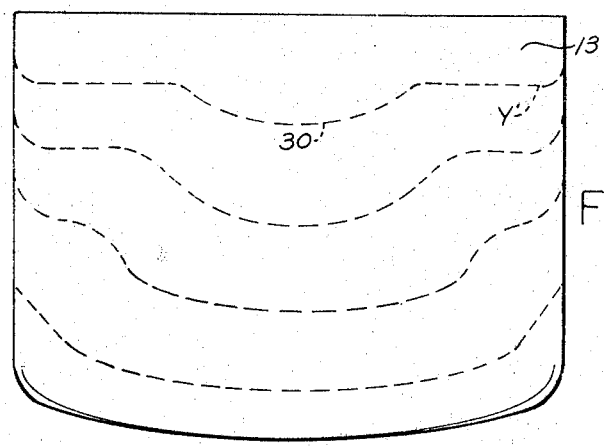
FIG. 3 is a schematic top plan view illustrating the sequence of positions of the confinement during inflation of the confinement shown in FIG. 1.
Figure 4:
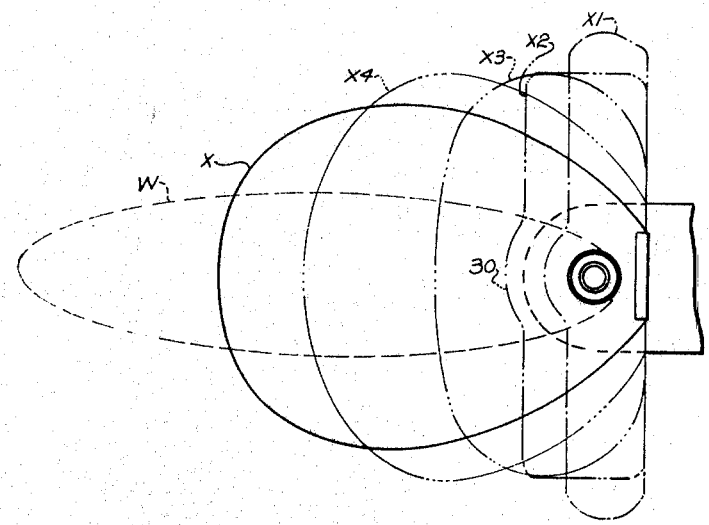
FIG. 4 is a schematic side elevational view illustrating the sequence of positions of the confinement during inflation of the confinement.

The fluid which flows through the openings 27 impinges against a surface 40a of a back plate 40. The direction of fluid flow is thereby changed by the surface 40a causing the fluid to flow outwardly of the surface 40a and along the surface 40 and as a result, the general direction of the flow of fluid is somewhat parallel to the surface 40a and, as best shown in FIGS. 3 and 4, the confinement initially is inflated in directions generally transverse to the direction of the arrow 22. These directions may be referred to as laterally of the occupant. This lateral inflation occurs to a substantially large extent prior to any substantial inflation in the direction of arrow 22.

As shown in FIGS. 3 and 4, the confinement is initially expanded to the position designated X' with the wall portion 30 located forwardly of other portions of the confinement so as to operate to effect movement of the occupant, as described above, as the confinement is being inflated and to protect the occupant from being impacted with the full force of inflation of the confinement, which probably would result in injury to the occupant. As the confinement is inflated, the lateral extent of the confinement becomes less and less and the extent of the confinement toward the occupant becomes greater and greater. As illustrated by the positions designated $X^2$, $X^3$, and $X^4$, finally the confinement takes the position shown in full lines and designated X in FIG. 4.

The inflation is similar as viewed in a top plan view to that shown in FIG. 3. Again the inflation is primarily lateral as shown by the dotted line $Y^1$ and as the confinement inflates, the portion 30 leads other portions of the confinement until the confinement is fully inflated, as shown by full lines in FIG. 3.

The mode of inflation of prior art confinements is illustrated in dotted lines in FIG. 4. As shown, the initial flow of fluid into the confinement causes the confinement to expand toward the occupant prior to significant lateral expansion. Such a position is designated A in FIG. 4. The initial inflation is such that the confinement may forcefully strike and injure an occupant of the vehicle, particularly one who may be adjacent the collapsed confinement. The present invention, as described above, provides a solution to this problem.

When the confinement is fully inflated, it operates to restrain or resist forward movement of the occupant as a result of the collision. As is well known, there is a time interval between the impact of the vehicle with an obstruction and the instant of movement of the occupant relative to the vehicle as a result of the impact. During this time interval, the confinement is inflated and the confinement operates to restrain the movement of the occupant of the vehicle as a result of the collision. The occupant is "cushioned" by the confinement. The confinement is provided with a means for absorbing the energy of impact between the occupant and the confinement, such as a blowout patch A, or the like, shown in phantom lines in FIG. 1. The blowout patch A is described in co-pending application Ser. No. 806,049. The blowout patch provides for flow of the fluid from the confinement, as the occupant and confinement move relatively. Moreover, the supply of fluid is sufficient to provide a continuous flow of fluid into the confinement for a time interval, all as described in copending application Ser. No. 665,070.

Figure 5:
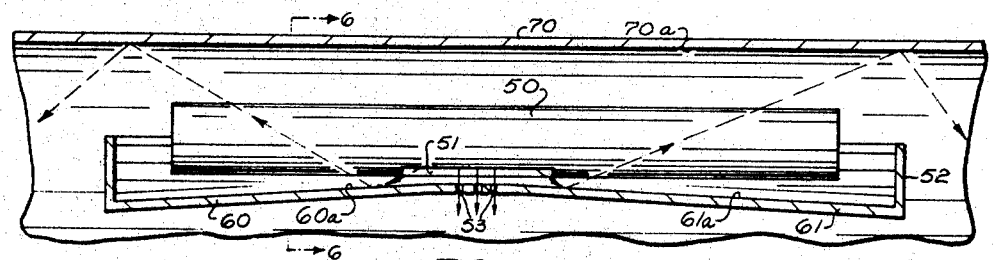
FIG. 5 is a sectional view of a modified apparatus for directing the fluid flow into the confinement.
Figure 6:
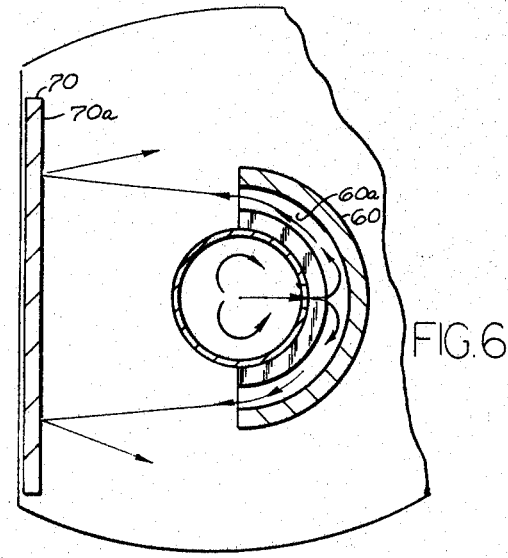
FIG. 6 is a sectional view taken approximately along the section line 6—6 of FIG. 5.

A modified embodiment of the present invention is illustrated in FIGS. 5 and 6. This embodiment operates in substantially the same manner as that described above in connection with FIGS. 1–4. The inflation of the confinement is controlled so as to provide an initial relatively small force to effect movement of an unrestrained occupant by initial inflation of a small portion of the confinement. The flow of fluid into the confinement, however, is controlled somewhat differently than in the embodiment of FIGS. 1–4.

The fluid in the embodiment of FIGS. 5 and 6 is stored in a container, generally designated 50, and which container is opened by an explosive, schematically shown in FIG. 5 and designated 51. The explosive 51 is located on the portion of the container which faces the occupant of the vehicle, and fluid flows outwardly of the opening formed in the container in a direction toward the occupant of the vehicle and which is the direction of inflation of the confinement. A diffuser member 52 is located in the path of the flow of fluid.

The diffuser member 52 has small openings 53 in a central portion of the diffuser and which openings provide for a small amount of flow into the confinement to effect movement of an initial portion of the wall of the confinement in the same manner as the openings 28 in connection with the modification shown in FIGS. 1–4.

The major portion of the diffuser is tapered away from the opening formed by the explosive. More specifically, the diffuser includes a generally conical-shaped portion 60 and a second conical-shaped portion 61, both of which connect with the portion of the diffuser which has the openings 53. The portions 60, 61 are disposed so as to slant away from the opening formed in the container 50 by the explosive. As a result of the construction of the diffuser, fluid flowing from the container 50 impinges against the inner arcuate surfaces 60a, 61a, which surfaces are inclined at an angle with respect to the direction of flow of fluid. As a result, the fluid is directed outwardly and laterally from the opening in the container 50 and a spreading or lateral dispersion of the fluid is effected, as designated by the dotted arrows in FIG. 5. Likewise, a vertical dispersion of the fluid is effected, as shown in FIG. 6, due to the fact that the fluid will flow around the surfaces 60a, and 61a, as indicated by the arrows in FIG. 6.

The diffuser member 52 is located between the fluid supply 50 and the occupant of the vehicle, and the fluid which is initially directed against the surfaces 61a, 60a is then directed away from the occupant and away from the direction of expansion of the confinement. This flow then impinges against a surface 70a of a back member plate 70 which is located so as to direct the fluid flow into the confinement as described above in connection with FIGS. 1–4.

It should be apparent from the above, that a new and improved vehicle safety apparatus has been provided hereby and that certain modifications, changes, and adaptations may be made therein, and it is intended to cover all such modifications, changes, and adaptations which come within the scope of the appended claims.

Having described my invention, I claim:

1. Apparatus for protecting an occupant of a vehicle during a collision comprising first means movable from an inoperative position to an operative position wherein said means is positioned to restrain movement of the occupant as a result of the collision, and second means for initiating movement of the occupant relative to said first means by application of a force smaller than the force generated by said first movable means in the event the occupant is located to be engaged by said first means on movement of said first means to said operative position.

2. Apparatus as defined in claim 1 wherein said second means operates during the interval between the initial impact of the vehicle with an obstruction and the initial movement of the occupant relative to the vehicle as a result of the collision.

3. Apparatus as defined in claim 1 wherein said first means comprises an inflatable confinement and said second means comprises a wall portion of said confinement.

4. Apparatus as defined in claim 3 further including a supply of fluid pressure providing fluid for effecting inflation of said confinement and a diffuser member positioned between said supply of fluid and said confinement and effecting a diffusiion of the fluid flowing into said confinement from said supply.

5. Apparatus as defined in claim 4 further including a member having a surface against which fluid from said diffuser is impinged and said surface directing fluid into said confinement to effect inflation of said confinement.

6. Apparatus as defined in claim 5 wherein said diffuser has tapered surface portions which extend at an angle to the direction of flow of fluid and which provide for spreading of the fluid flow.

7. Apparatus comprising a confinement for mounting in a vehicle, said confinement having a collapsed condition and an inflated condition for protecting an occupant of the vehicle during a collision, a supply of fluid, means for releasing said supply of fluid to provide for flow of fluid therefrom, and means for directing said fluid flow into said confinement including means for directing a small fluid flow into the confinement to effect movement of a part of said confinement toward the occupant in advance of movement of other parts of said confinement toward the occupant.

8. Apparatus as defined in claim 7 further including a diffuser member located between said supply of fluid and said confinement and operable to diffuse the fluid flow.

9. Apparatus as defined in claim 8 further including a member having a surface against which the fluid is impinged as it flows from said diffuser, said fluid after impinging on said surface flowing into said confinement, said diffuser and said surface effecting a substantial diffusion of the fluid flow.

10. Apparatus as defined in claim 9 wherein said diffuser has tapered surface portions which extend at an angle with respect to the direction of flow of the fluid and effect a spreading of the fluid which impinges on said surface portion.

11. Apparatus comprising a supply of fluid, means for releasing said supply of fluid to provide for flow of fluid therefrom, a diffuser member located in the path of flow of said fluid, said diffuser member having a surface portion which is tapered with respect to the direction of fluid flow and which changes the direction of flow of the fluid and spreads the flow of fluid, and a member against which the fluid from said diffuser member is impinged and which again changes the direction of fluid flow and further diffuses the fluid flow.

12. Apparatus as defined in claim 11 further including a confinement having a collapsed condition and in inflated condition and which is inflated by said fluid flow.

13. Apparatus as defined in claim 12 wherein said diffuser member has passageways therein for directing a minor portion of the fluid flow directly into said confinement to effect movement of a wall portion of the confinement in advance of inflation of other parts of the confinement.

References Cited

UNITED STATES PATENTS

| | | | |
|---|---|---|---|
| 2,834,606 | 5/1958 | Bertrand | 280—150 |
| 2,834,609 | 5/1958 | Bertrand | 280—150 |
| 2,850,291 | 9/1958 | Ziccardi | 280—150 |

BENJAMIN HERSH, Primary Examiner

J. E. SIEGEL, Assistant Examiner